Patented Sept. 8, 1936

2,053,745

UNITED STATES PATENT OFFICE 2,053,745

PROCESS OF PREPARING A SOLID TETRAZO SALT

Karl Schnitzspahn, Offenbach-on-the-Main, Germany, assignor to General Aniline Works, Inc., New York, N. Y., a corporation of Delaware No Drawing. Application June 20, 1934, Serial No. 731,533. In Germany June 24, 1933

6 Claims. (Cl. 260—69)

The present invention relates to a process of preparing a solid tetrazo salt from 1,4-diaminobenzene.

As is known from the literature, para-phenylenediamine could hitherto not directly be tetrazotized on a technical scale. In the manufacture of disazo dyestuffs from para-phenylenediamine this difficulty is overcome by starting from para-nitraniline or mono-acetyl-para-phenylenediamine and reducing or saponifying the mono-azo dyestuffs obtained from these bases, then diazotizing again and combining the diazo compounds with coupling components. A summary of the pertaining art describing the experiments hitherto made with regard to the tetrazotization of para-phenylenediamine may be found in the publication of Schoutissen (cf. "Journal of the American Chemical Society", vol. 55 [1933], page 4535 et seq.).

Now, I have found that 1,4-diaminobenzene may easily be tetrazotized in concentrated sulfuric acid by introducing the base or its sulfate into a solution of nitrosylsulfuric acid or nitrous acid or sodium nitrite in concentrated sulfuric acid.

Furthermore, I have found that the benzene-tetrazonium sulfate, thus prepared in concentrated sulfuric acid solution, is sparingly soluble in cold aqueous sulfuric acid of about 30 to 90% strength and may be separated at a temperature of below 0° C. with a very good yield in the form of the solid acid sulfate of the composition $C_6H_4(N_2SO_4H)_2$ and may be freed by filtering from the greatest part of the excess of sulfuric acid. By addition of, for instance, sodium or ammonium sulfate, the separation may be accelerated.

The benzene-tetrazonium-sulfate may also be obtained in a solid form by diluting the tetrazotization product, obtained in concentrated sulfuric acid, with such organic liquids as are miscible with sulfuric acid of about 70 to 90% strength, such as, for instance, the low members of aliphatic alcohols or ketones, and then filtering off the tetrazonium sulfate, preferably, at a low temperature.

The benzene-tetrazonium-sulfate may be dried with special precaution, preferably after dilution with suitable metal sulfates or arylsulfonic acid metal salts. It is of advantage to work it up at once.

The smooth course of reaction of the present process could not be foreseen since, as is known, para-phenylenediamine is easily oxidizable; for this reason, it was rather to be supposed that according to the working conditions applied oxidation of the para-phenylene-diamine and formation of quinone would occur.

By the present invention not only the smooth tetrazotization of para-phenylenediamine has been made possible but also excellent yields of tetrazonium-benzene-sulfate of high percentage, separated in solid form, are obtained. Hitherto, it has also not been possible to separate the tetrazo compound of para-phenylene-diamine on a technical scale which fact could not be foreseen in view of the publications of Hantzsch and Borghaus, "Berichte der deutschen chemischen Gesellschaft", vol. 30 [1897], pages 92 to 93, since the prescription given for the tetrazotization in hydrochloric acid does not enter into consideration for the manufacture on an industrial scale.

Therefore, the present invention represents a considerable technical advance.

The following example serves to illustrate the invention, but it is not intended to limit it thereto, the parts are by weight.

At a temperature of about 20° C. to 25° C., 108 parts of finely powdered 1,4-diaminobenzene or 206 parts of its sulfate are introduced with precaution, while stirring, into a solution of 265 parts of nitrosylsulfuric acid of the composition $HSO_5N$ in 800 parts of sulfuric acid of about 78% strength. Stirring is continued at about 25° C. until the tetrazotization is finished, whereby complete dissolution takes place. The tetrazonium sulfate may be separated from this concentrated sulfuric acid tetrazo solution by one of the following methods:

By cooling this solution to −15° C., the tetrazonium sulfate is separated with a nearly theoretical yield and may be filtered through an acid-proof filter.

By pouring the concentrated sulfuric acid tetrazo solution upon about 600 parts of ice, while cooling, the tetrazonium-sulfate likewise separates. It is filtered at −15° C. and is obtained in solid form with a very good yield, only a small amount of sulfuric acid mechanically adhering thereto.

The solid tetrazonium-sulfate may also be obtained by pouring the concentrated sulfuric acid tetrazo solution into about 1600 parts of an aliphatic alcohol or ketone such as methanol, ethanol or acetone, while cooling well, and then filtering the tetrazonium-sulfate at a low temperature.

I claim:

1. The process which comprises tetrazotizing 1,4-diamino-benzene in concentrated sulfuric acid and separating at a temperature of below 0° C. the solid tetrazonium sulfate from the concentrated sulfuric acid tetrazo solution.

2. The process which comprises tetrazotizing 1,4-diamino-benzene in concentrated sulfuric acid and separating at a temperature of below 0° C. the solid tetrazoniom sulfate from the concentrated sulfuric acid tetrazo solution, after dilution with a liquid diluting agent which is indifferent to and miscible with sulfuric acid of about 70 to 90% strength.

3. The process which comprises introducing 1,4-diamino-benzene into a solution of nitrosylsulfuric acid in sulfuric acid of 78% strength at a temperature not materially exceeding 25° C. and separating at a temperature of about −15° C. the solid tetrazonium sulfate from the concentrated sulfuric acid tetrazo solution.

4. The process which comprises introducing 1,4-diamino-benzene into a solution of nitrocylsulfuric acid in sulfuric acid of 78% strength at a temperature not materially exceeding 25° C. and separating at a temperature of about −15° C. the solid tetrazonium sulfate from the concentrated sulfuric acid tetrazo solution, after dilution with water.

5. The process which comprises introducing 1,4-diamino-benzene into a solution of nitrosylsulfuric acid in sulfuric acid of 78% strength at a temperature not materially exceeding 25° C., and separating at a temperature of about −15° C. the solid tetrazonium sulfate from the concentrated sulfuric acid tetrazo solution, after dilution with an alcohol of the lower aliphatic series.

6. The process which comprises introducing 1,4-diamino-benzene into a solution of nitrosylsulfuric acid in sulfuric acid of 78% strength at a temperature not materially exceeding 25° C., and separating at a temperature of about −15° C. the solid tetrazonium sulfate from the concentrated sulfuric acid tetrazo solution, after dilution with a ketone of the lower aliphatic series.

KARL SCHNITZSPAHN.